(12) United States Patent
Schumacher

(10) Patent No.: US 6,361,732 B1
(45) Date of Patent: Mar. 26, 2002

(54) PROCESS FOR AN INTERIOR TRIM PART FACE-SIDE COATING

(75) Inventor: Rolf Schumacher, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 1417 days.

(21) Appl. No.: 08/647,881

(22) Filed: May 13, 1996

Related U.S. Application Data

(63) Continuation of application No. 08/243,101, filed on May 16, 1994, now abandoned.

(30) Foreign Application Priority Data

May 14, 1993 (DE) .......................................... 43 16 154

(51) Int. Cl.⁷ ......................... B29C 41/14; B29C 41/20; B29C 33/02; B29C 45/14
(52) U.S. Cl. ...................... 264/275; 264/279.1; 264/301
(58) Field of Search ................................ 264/511, 255, 264/299, 301, 259, 260, 265, 266, 303, 275, 306, 279.1

(56) References Cited

U.S. PATENT DOCUMENTS

| | | | | |
|---|---|---|---|---|
| 3,247,550 A | * | 4/1966 | Haines, Jr. ................... | 264/511 |
| 3,293,338 A | * | 12/1966 | Voelker ....................... | 264/301 |
| 3,390,214 A | * | 6/1968 | Woods ........................ | 264/511 |
| 3,505,141 A | | 4/1970 | Sorensen et al. ............ | 156/214 |
| 3,755,031 A | * | 8/1973 | Hoffman ..................... | 264/511 |
| 4,289,817 A | * | 9/1981 | Valyi .......................... | 264/511 |
| 4,606,868 A | * | 8/1986 | Christoph et al. .......... | 264/301 |
| 4,892,544 A | * | 1/1990 | Frisch ......................... | 264/301 |
| 5,091,031 A | * | 2/1992 | Strapazzini ................. | 264/511 |
| 5,174,933 A | | 12/1992 | Toh et al. ................... | 264/40.5 |
| 5,256,235 A | * | 10/1993 | Howell et al. .............. | 264/511 |
| 5,286,421 A | | 2/1994 | Arai ........................... | 264/1.7 |

FOREIGN PATENT DOCUMENTS

| | | |
|---|---|---|
| DE | 25 46 466 | 4/1976 |
| EP | 0 168 026 | 1/1986 |
| FR | 2546808 | 12/1984 |
| GB | 1046856 | 10/1966 |
| GB | 2177342 | 1/1987 |
| WO | WO 90/14202 | 11/1990 |

* cited by examiner

Primary Examiner—Angela Ortiz
(74) Attorney, Agent, or Firm—Crowell & Moring LLP

(57) ABSTRACT

A process for the face-side, in particular thick, coating of a motor vehicle interior trim part or the like inserts the interior trim part, in uncoated form, in a defined position in a diecasting or injection molding tool. A mold tool with polished surface is laid under pressure and under heat against the face-side surface of the coating. In the mold tool, the resin or the lacquer is applied under pressure and under heat in a single operation onto the interior trim part surface to be coated in the manner of an injection molding or diecasting process despite a shrinkage due to curing. The resin or the lacquer is acted on with a uniform pressure during the entire curing time. The pressure is chosen such that any air present in the liquid resin or lacquer is dissolved.

12 Claims, 3 Drawing Sheets

PROCESS FOR AN INTERIOR TRIM PART FACE-SIDE COATING

This application is a continuation of application Ser. No. 08/243,101, filed on May 16, 1994 now abandoned.

BACKGROUND AND SUMMARY OF THE INVENTION

The present invention relates to a process for the face-side coating of an interior trim part and more particularly, to a process for motor vehicle interior trim parts in which the face side is coated with a cross-linkable curing resin or lacquer and in which the coating of resin or lacquer is subject to an elevated pressure to increase the surface quality, a mold tool with polished surface being laid under pressure and under heat against the face-side surface of the coating and the interior trim part being removed only after drying of the resin or lacquer.

EP 168 026 A2 discloses a process for producing a scratch-resistant, transparent coating of a visor for a motor cycle helmet. A cross-linkable resin or lacquer is applied to at least one side of the visor and is cured. To improve the surface of the coating, the visor with the cured resin or lacquer is subsequently inserted into a mold tool in the form of a plate press and whose tool surfaces opposite the coating are polished. In the mold tool, the surface of the lacquer is acted on with a pressure of, for example, 30 bar, a temperature of approximately 150° C. being at the same time present. With the exception of constantly occurring air inclusions in the coating, which inclusions increase the reject rate, this known process provides good results for thermoplastic materials. For interior trim parts such as linings of surfaces, steering wheels, gearshift knobs or the like, which may have, on at least one side, a decorative wood veneer to be coated, however, the known process is too time consuming. Furthermore, the layer thickness of the coating can only be determined within wide limits which, particularly in the case of dimensionally accurate interior trim parts may lead to installation complications.

German Offenlegungsschrift 25 46 466 discloses a conventional process for coating a substrate, such as chipboards, with thermoplastic material. A chipboard and the solid thermoplastic material initially having a cellular structure are inserted in a positionally defined manner into a mold tool. The material is subsequently melted, with the tool closed and a pressure exerted on the thermoplastic material, to form the covering, during which the cellular structure of the thermoplastic material is destroyed. During melting, the upper tool and the lower tool are moved towards one another, so that the contact between the shaping surfaces of the tool and the surface of the coating is not interrupted. By virtue of the varying roughness of the surface of the material to be coated, however, problems occur time and again. For example, in the case of a rough surface, the cellular structure is sometimes only partly destroyed, leading to an impairment of a transparent coating. In the case of very smooth surfaces, although the cellular structure is completely transformed into a homogeneous coating, the layer thickness of the coating in this case is too high in some circumstances, since the mold tool cannot be completely closed. With both surfaces, for example in the case of wood surfaces having air inclusions, system-dependent air inclusions occur repeatedly in the coating. For this reason, the conventional coating process is also unsuitable for transparent coatings because of such defect sources. Furthermore, this conventional process is also very time consuming, since, in addition to the substrate, the thermoplastic material also has to be inserted into the tool, with the thermoplastic material having previously to be machined to the dimensions appropriate for insertion. Cellular-structure starting material is also expensive.

An object of the present invention is to provide an improved coating process such that, with a minimum reject rate caused by a visible inclusion of air, a coating, which is as transparent as possible and largely free at least of visible bubbles, of an interior trim part face-side surface is possible with relatively little time consumption.

The foregoing object has been achieved according to the present invention by a process in which the interior trim part is inserted, in uncoated form, in a defined position in a diecasting or injection-molding mold tool, the resin or the lacquer being applied to the surface, to be coated, of the interior trim part in the manner of an injection molding operation or diecasting operation, in that the resin or the lacquer is applied in the closed mold tool with the required overall thickness in a single operation and, in that, during the entire curing time, despite shrinkage due to curing, a temporally uniform pressure is exerted on the resin or lacquer, which is initially liquid and subsequently curing in the mold tool, said pressure being chosen such that any air present in the liquid resin or lacquer is dissolved.

By virtue of the new process according to the present invention, including the surface forming and the curing of the resin or lacquer in a single tool, the production time needed for a transparently coated interior trim part is reduced and it is possible to remove the finally processed workpiece from the mold tool. Furthermore, any interior trim part can therefore be produced with high precision within predeterminable dimensions. The reject rate as a result of air bubbles visibly dissolved in the coating is, at the same time, reduced because this air largely goes into solution at the prevailing pressure.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
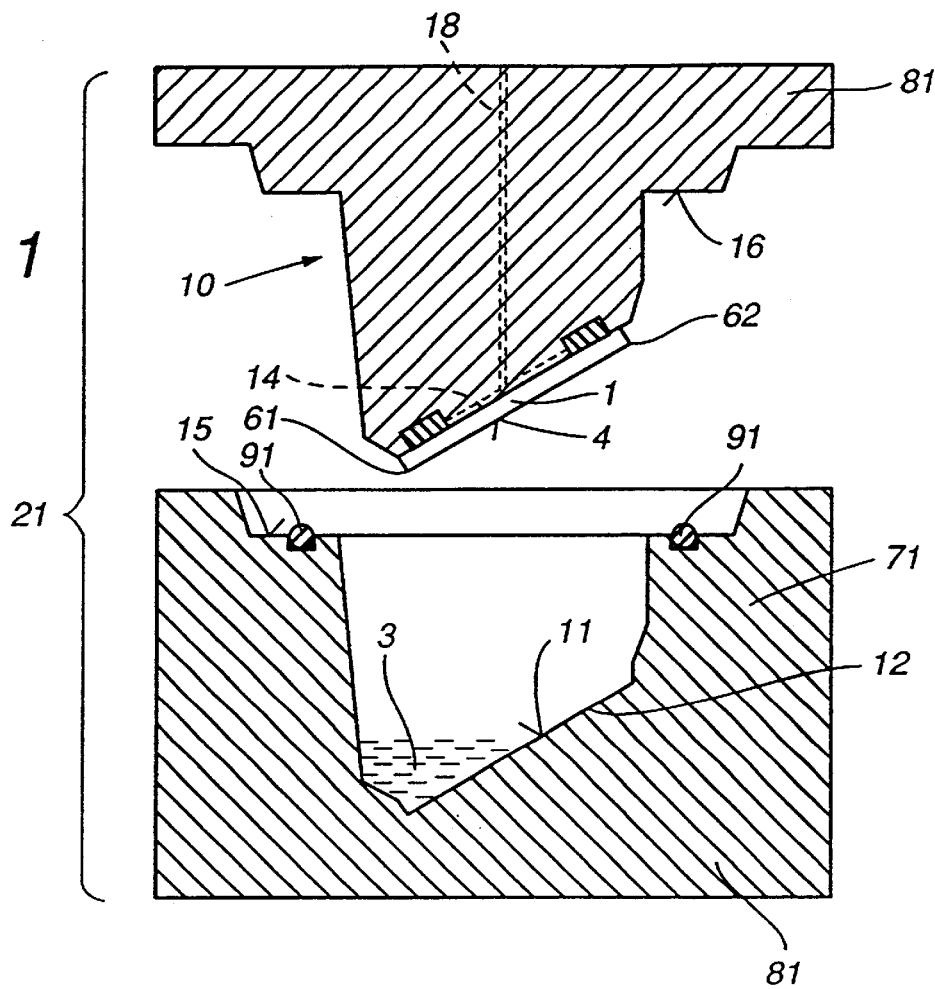
FIG. 1 is a cross-sectional elevation view of one embodiment of a mold tool, in the open position, for coating a lining part.

FIG. 1 shows an open mold tool 21 which is suitable for carrying out the process according to the present invention. The mold tool 21 provided for the face-side coating of interior trim parts 1 of, for example, motor vehicles has a lower tool 71 and an upper tool 81 provided with a plunger 10. The upper tool 81 and the lower tool 71 are advantageously configured so as to be heatable in a known manner.

The lower tool 71, which in the open state is freely accessible from above, has a trough-shaped cross-section. A polished base 11 in a trough 12 lays opposite a to-be-coated surface 4, of the inserted interior trim part 1, of the trough 12 and rises towards its edges. The structure of the base 11 of the trough 12 reproduces in negative form the surface 4 to be coated so that the coating 13 can also be provided with surface structures such as seams, grains etc. It is furthermore also within the scope of the present invention to provide engravings and other special effects such as a matt coating or a glossy coating 13.

Figure 3:
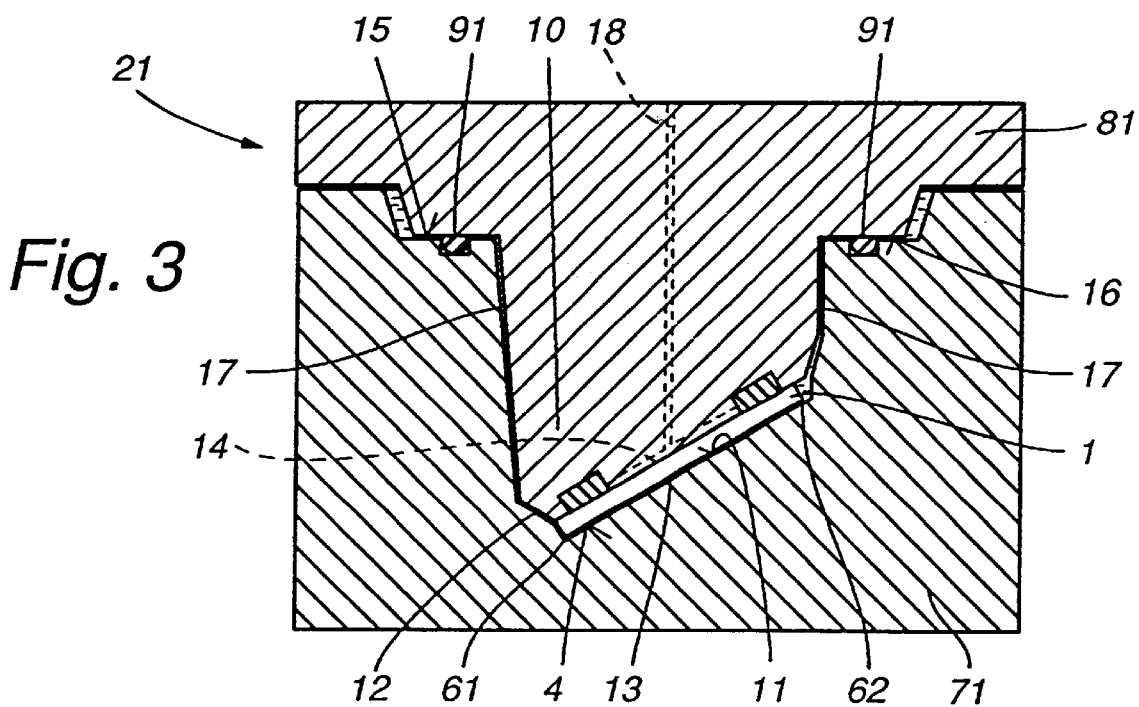
FIG. 3 is a view similar to FIG. 1 but with the mold tool the upper tool in a limiting position.

The interior trim part 1 is held in particular by a vacuum device 18 on the end face of the upper tool plunger 10, immersed in the trough 12, of the upper tool 81. Fixing of the interior trim part 1, which can also be, for example, a steering wheel, by vacuum is not absolutely necessary but may also be done by purely mechanical apparatus. For vacuum mounting the interior trim part 1, the end face of the plunger 10 is shaped corresponding to the negative of the reverse side 14 opposite to the to-be-coated surface 4 of the interior trim part 1. Thereby, the picked up interior trim part 1 lies with its reverse side 14 closely against the end face of the plunger 10 of the upper tool 81. Furthermore, the spatial position of the end face and the guidance of the plunger 10 are configured such that, during coating of the interior trim part 1, the distance between the to-be-coated surface 4 and the base 11 of the trough 12 of the lower tool 71 corresponds, when the upper tool 81 is in the limiting position, as shown in FIG. 3, to the respectively desired material thickness of the cured coating 13.

Figure 2:
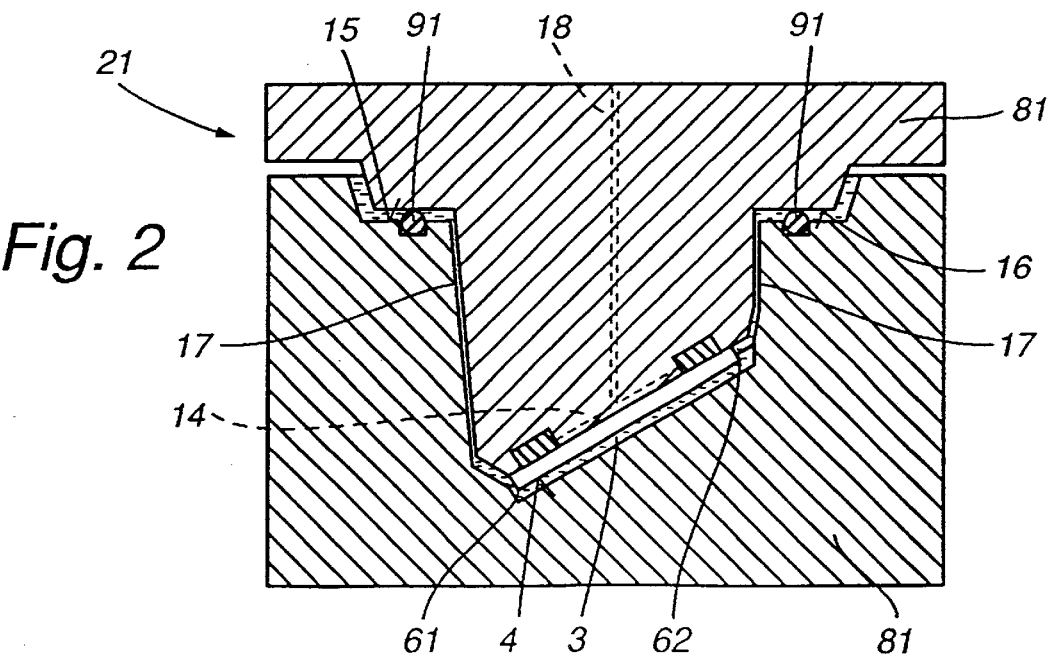
FIG. 2 is a view similar to FIG. 1 but with the mold tool in the closed position.

A seal 91 which is closed upon itself is arranged (e.g. an O-ring) on the upper edge 15 of the trough 12, and, as shown in FIG. 2, interacts with a corresponding sealing surface 16 of the lowered upper tool 81, to seal the trough 12 with respect to the exterior. The height of the seal 91 above the upper edge 15 of the trough 12 is in this embodiment chosen such that the commencement of the sealing contact of the sealing surface 16 of the upper tool 81 starts at a moment at which the upper tool 81 is still moving towards its limiting or end position. A further seal is arranged on the end face of the plunger 10 of the upper tool 81 and, inter alia, seals the vacuum-held reverse side 14 of the interior trim part 1.

The process according to the present invention using the aforedescribed mold tool 21 is described below with reference to a sequence of steps understood by reference to FIGS. 1 to 3.

In FIG. 1, the uncoated interior trim part 1 is laid in a defined position against the end face of the upper tool 81 and held in this position by a vacuum applied to its sealed reverse side 14. During this step, a metered. volume of an incipiently mixed reactive resin 3, preferably a two-component polyester resin, is filled into the trough 12 of the lower tool 71. The composition of the resin 3 is adapted to the process conditions such that, at the prevailing temperature of the closed mold tool 21 and under the pressure acting on the resin 3, short cycle times of at most 10 to 15 minutes are achieved. The cycle times may be controlled via the temperature affecting the curing.

After the interior trim part 1 has been inserted in a defined position and the resin 3 has been filled in, the plunger 10 of the upper tool 81 is moved into the trough 12. From a specific immersion depth of the upper tool 81 into the trough 12, the outwardly rising end face of the plunger 10 and the interior trim part 1. held thereon displace the resin 3 filled in the trough 12. As a result, the to-be-coated surface 4 of the interior trim part 1, with the mold tool 21 advantageously outwardly open, is wetted with the resin 3 progressively from one of its edge faces 61 to its other edge face 62.

Following the complete wetting of the surface 4, the mold tool 21 is advantageously closed by laying the sealing surface 16 of the upper tool 81 against the seal 91 arranged on the upper edge 15 of the trough 12 and configured in the manner of a flexible O-ring (FIG. 2). The closing of the mold tool 21 only takes place when the air previously disposed between the trough 12 and the plunger 10 of the upper tool 81 has been displaced by the resin 3 rising during immersion of the plunger 10. So that it is ensured that the air is largely displaced out of the trough 12, the mold tool 21 is only closed when a small volume of resin 3 has flowed out via the seal 91. The resin 3 passes, via a flash clearance 17 lying laterally between the plunger 10 of the upper tool 81 and the trough sides, from the base 11 of the trough 12 to the seal 91.

After the closing of the mold tool 21, a pressure is exerted on the incompressible resin 3 heated by the mold tool 21. This pressure is applied by a slight further movement of the plunger 10 into the trough 12. Depending on the resin 3, the pressure is chosen sufficiently high so that the residual air contained in the resin 3 of the trough 12 and originating at least partly from the to-be-coated surface 4 of the interior trim part 1 is dissolved in the resin 3. A dissolution of the air in the resin 3 is also understood to mean a fine distribution of air bubbles in which, at least under normal conditions, the air is invisible in the coating 13 after drying of the resin 3. This is also possible since, when the interior trim part 1 is viewed, the coating 13 always has a darker background than the surroundings. As a result, the probability of recognizing these bubbles by a shadow thrown in the direction of the eye can be largely discounted or is small.

To assure that the air passes into solution and also remains in solution, the pressure is maintained on the resin 3 during the entire curing time. This is preferably achieved by post-pressing the upper tool 81, corresponding to the resin shrinkage due to curing against the elasticity of the seal 91, to enable and permit a certain post-movement of the upper tool 81 bearing sealingly against the lower tool 71. The desired layer thickness of the coating 13 is achieved when the limiting position of the plunger 10 shown in FIG. 3 is reached. In the case of the upper tool 81, also disposed in the limiting position, the upper edge 15 of the trough 12 and the sealing edge 16 of the upper tool 81 are at a distance from one another so that in the event of leakages, for example, additional post-pressure can be exerted if appropriate. The surrounding flash clearance 17 thus ensures a uniform distribution of the pressure on the resin 3. In this embodiment, a control is achieved in a simple way by a path-independent working pressure acting on the upper tool 81. For the maintenance of the pressure in the mold tool 21, the reverse side 14 of the interior trim part 1 is also sealed in the region in which it is held by vacuum against the end face of the plunger 10 of the upper tool 81.

In the closed mold tool 21, the resin 3 applied dimensionally accurately with the required overall thickness in a single operation cures with the desired layer thickness. The surface of the cured coating 13 corresponds to the negative of the base 11 of the trough 12. This base 11 is polished so that this surface remains free of undesired irregularities.

With this embodiment, however, a narrow and, if appropriate, also deep flash clearance 17 must be present when low-viscosity resins is used so that, beyond the high resistance resulting therefrom, an adequately high pressure can be obtained in the mold tool 21, 22, 23. The flash clearance 17 is necessary in the case of this pressing method to be able to achieve, independently of the geometry of the interior trim part 1 or its position in the mold tool 21, 22, 23, a horizontal, surrounding seal which is achieved simultaneously by the resin at all points and prevents the resin 3 from being able to flow out before the mold tool 21, 22, 23 is closed.

The flash clearance 17 is configured to be as thin as possible so that the waste to be separated off is small. In addition, the flash clearance 17, taking into account sufficient draft for demolding, is aligned as steeply as possible so as not to oppose a post-settlement of the upper tool 81, 82, 83 during the curing of the resin 3.

Figure 4:
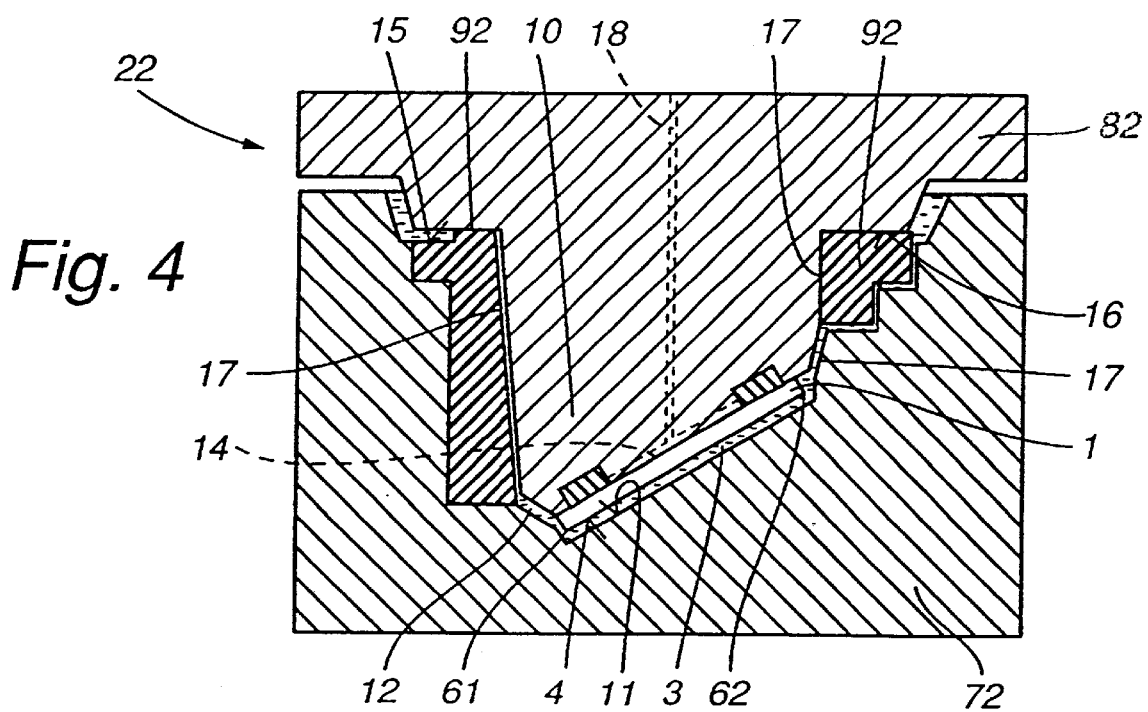
FIG. 4 is a cross-sectional elevation view of another embodiment of the mold tool.

FIG. 4 shows a further embodiment of a mold tool 22. The principal difference from the mold tool 21 of FIG. 1 results in an elastic seal 92 which is arranged parallel to the demolding direction, i.e. parallel to the movement direction of the plunger 10. This seal 92 is preferably produced as an elastomer molding cast into the lower tool 72. The flash clearance 17 is also present in this embodiment. The function of the mold tool 22 of FIG. 4 corresponds largely to that of the mold tool 21 according to FIG. 1, so that further discussion thereof is unnecessary. Only the reference numbers of the mold tool 22, of the lower tool 72, of the upper tool 82 and of the seal 92 have to be exchanged with reference numbers 21, 71, 81 and 91 of FIG. 1, respectively.

Figure 5:
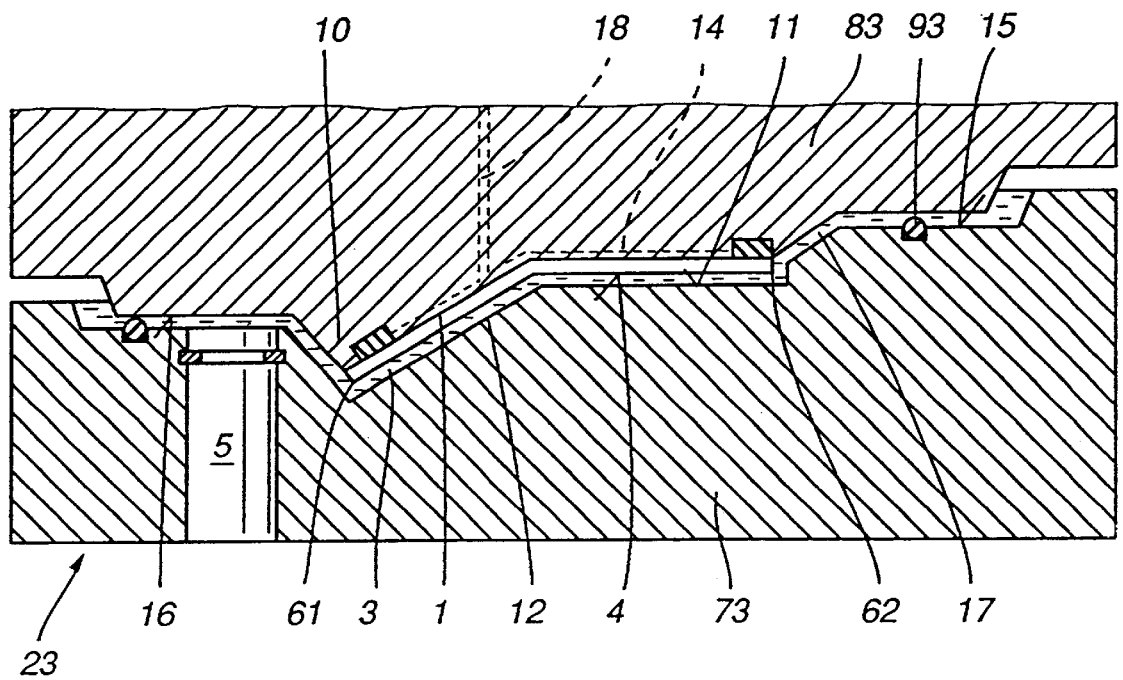
FIG. 5 is a cross-sectional elevation view of yet another embodiment of a mold tool with a plunger filling the resin or the lacquer into the mold.

A further mold tool 23 with a plunger 5 filling the resin 3 into the trough 12 is shown in FIG. 5. With the exception of the plunger 5 arranged in the lower tool 73 and feeding the resin 3, this mold tool 23 is similar to the above-described tools 21, 22. The mold tool 23 is, however, of particular advantage when the simple method of free pouring of the resin 3 into the shaping regions of the mold tool 23 is to be used and when an interior trim part 1 is to be selectively gated at a specific point. In the case of mold tool 23, the functional relationship is as follows.

The resin 3 is filled openly into a cylinder which is associated with the lower tool 73 and in which the plunger 5 is guided. After the mold tool 23 has been closed, by lowering the upper tool 83 with associated immersion of the plunger 10 into the trough 12, to the extent that the seal 93 has come to bear, the plunger 5 forces the resin 3 out of the cylinder, via runners into the shaping regions of the mold tool 23. The plunger 5 is then locked in its position, so that no more resin 3 can flow in during the subsequent post-pressing. The subsequent pressing operation which is also applied with a further downward movement of the upper tool 83 as far as its limiting position, generates or maintains the required pressure in the mold tool 23, under which pressure the included air passes into solution.

Care must generally be taken in all embodiments that the temperature of the heated mold tool 21, 22, 23 is kept below that temperature at which the gases, in particular air, dissolved in the resin would become volatile again and would form bubbles in the coating, or at which stresses occur in the coating as a result of the temperature. A temperature range for the mold tool 21, 22, 23 or for the resin 3 of between 45° C. and 65° C., preferably between 50° C. and 60° C., has been found favorable.

The plunger 5 thus serves for conveying the resin 3 over the entire tool interior surface as far as the surrounding seal of the mold tool 23. In this arrangement, after the conveying of the resin 3, the plunger is mechanically or hydraulically locked, so that in the subsequent pressing operation, which is carried out by a further closing of the mold tool 23, no resin 3 can flow back into the cylinder chamber, which would at least make a pressure build-up in the mold tool 23 more difficult.

Apart from its above function, the plunger 5 can fulfil another influential function. The mold tool 23 is closed via a purely metallic seal via a purely metallic surrounding seal via the closing faces. The resin 3 is subsequently displaced via the plunger 5 as far as the closing faces, and the air disposed in the mold cavity is, at least for the most part, displaced from the resin 3 and forced out via the closing faces. The required mold interior pressure necessary for dissolving the air remaining in the mold cavity is in this case generated by a force exerted on the plunger 5. This mold interior pressure is applied until curing of the resin 3.

A special advantage of a mold tool operating using this method can be seen in the fact that the sealing does not have to be carried out at one level but, to obtain reduced flash, can be applied directly surrounding the component contour, and in the fact that, using a mold tool of this kind, coatings are possible which completely enclose the interior trim part 1, as is desired in the case of steering wheels or gearshift knobs.

In all embodiments, the interior trim part 1 can be coated on the to-be-coated surface 4 and on the edge faces 61, 62 located transversely thereto. It then is necessary, after the curing of the resin 3, if appropriate, to remove a sprue strip located at the edge faces 61, 62 of the interior trim part 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A molding process for face-side coating of an interior trim part of motor vehicles, comprising the steps of:
    (a) arranging an uncoated interior trim part in a defined position with respect to a mold tool;
    (b) supplying a volume of an initially liquid cross-linkable composition constituting one of a resin (3) and a lacquer to a portion of the mold tool having a polished surface configured to permit the composition to sequentially come into contact with the interior trim part;
    (c) operating the mold tool to wet a face-side surface of the interior trim part now located within the mold tool with a predetermined thickness of the liquid composition;
    (d) closing the mold tool and heating the liquid composition so that the composition is applied to the face-side surface in the closed mold tool with the predetermined thickness in a single operation; and
    (e) subjecting the liquid composition to an elevated uniform pressure during curing of the composition in which the composition undergoes a reduction in volume such that formation of visible bubbles in the liquid composition is prevented by dissolving air within the initially liquid composition during curing of the composition in the mold tool.

2. The process according to claim 1, wherein the composition has a thermally acceleratable curing property, and the mold tool is heated before commencement of forcing in of the composition.

3. The process according to claim 1, wherein one of the resin and the lacquer is fed in the predetermined overall thickness under pressure into the closed mold tool from the outside via a plunger.

4. The process according to claim 1, wherein the composition is a two-component polyester material.

5. The process according to claim 1, wherein the composition is selected so as to cure in no treater than 5 minutes at a temperature in the closed mold tool.

6. The process according to claim 1, wherein the interior trim part is also coated on edge faces disposed transversely to the coated face side surface.

7. The process according to claim 1, wherein the coating step is effected by dip coating, a pressure build-up only taking place with the sealing closing of the mold tool, and the interior trim part and of the lower tool of the mold tool are inclined relative to a horizontal such that the coating of the interior trim part takes place, due to displacement, progressively from one edge face of the interior trim part to another edge face.

8. The process according to claim 1, wherein to maintain the pressure on the resin or on the lacquer over the entire surface, an upper tool and a lower tool of the mold tool are moved relatively to one another, within a range of seal elasticity of a seal sealing therebetween to maintain the pressure over an entire surface of one of the resin and lacquer.

9. The process according to claim 8, wherein the upper tool is moved towards the lower tool to maintain the pressure, and to thereby post-press the liquid which has been partially cured.

10. The process according to claim 1, wherein the interior trim part is provided with a coating of at least 0.2 mm.

11. The process according to claim 1, where the interior trim part is provided with a coating of 0.5 mm.

12. The process according to claim 1, wherein the molding process is one of the diecasting and injection molding.

* * * * *